(No Model.) 2 Sheets—Sheet 1.
J. W. ELLS.
MANUFACTURE OF HOES.
No. 323,130. Patented July 28, 1885.
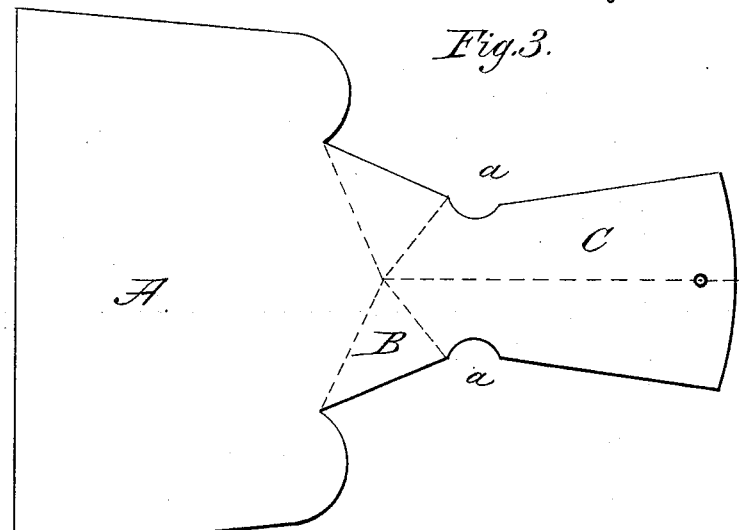
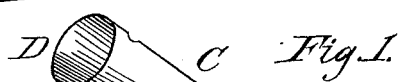
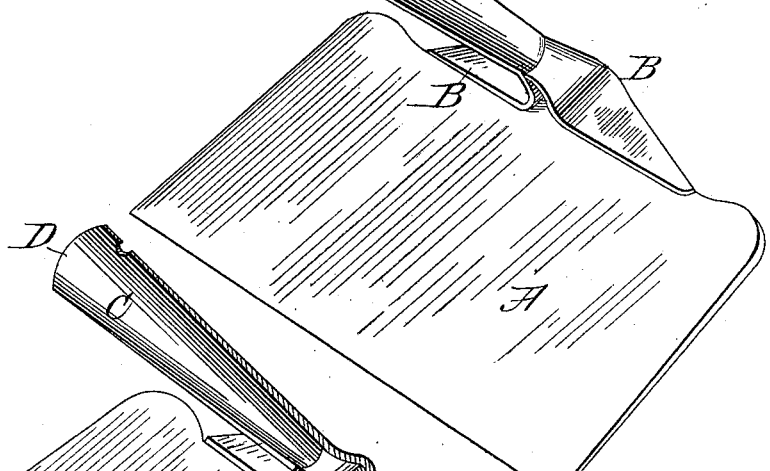
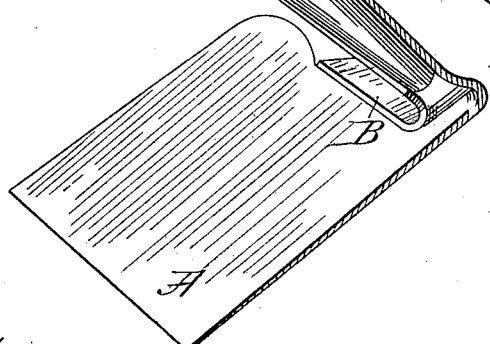
Attest:
F. H. Schott
Jas. S. Bell
Inventor:
Josiah W. Ells (No Model.) 2 Sheets—Sheet 2.
J. W. ELLS.
MANUFACTURE OF HOES.
No. 323,130. Patented July 28, 1885.
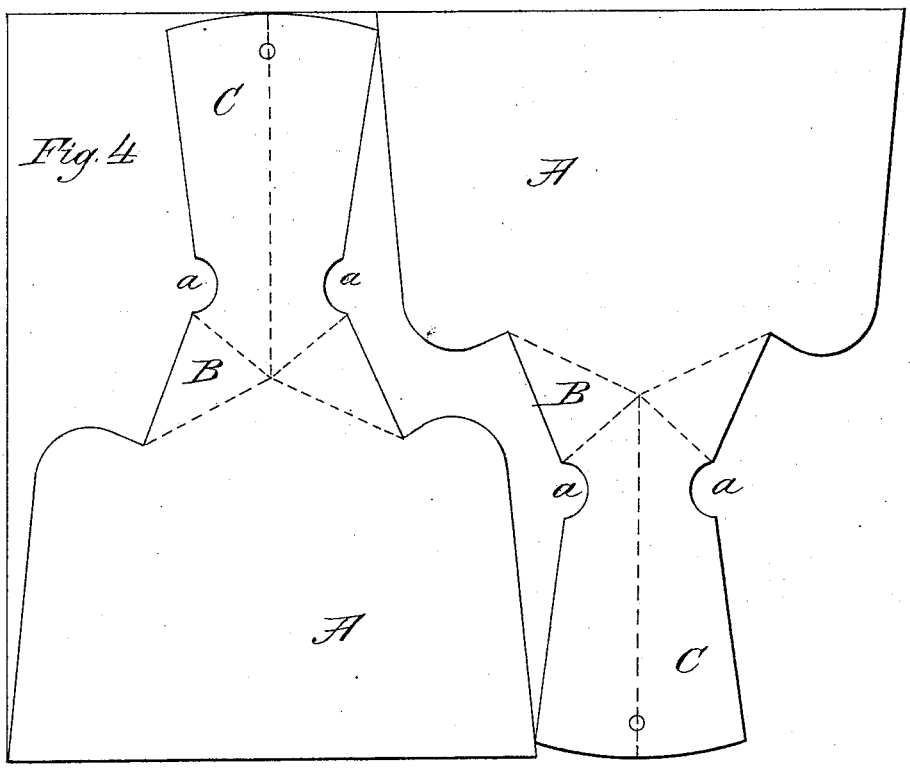
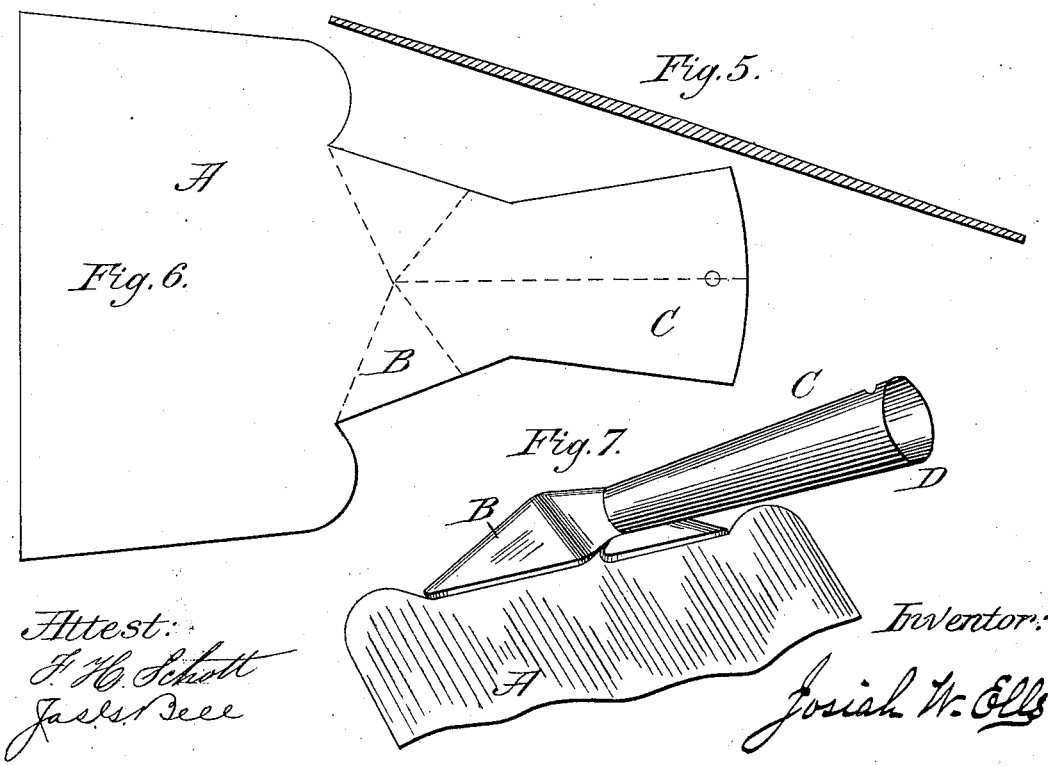
Attest:
F. H. Schott
Jas. S. Bell
Inventor:
Josiah W. Ells

UNITED STATES PATENT OFFICE.

JOSIAH W. ELLS, OF PITTSBURG, PENNSYLVANIA, ASSIGNOR TO RICHARD E. BREED, OF SAME PLACE.

MANUFACTURE OF HOES.

SPECIFICATION forming part of Letters Patent No. 323,130, dated July 28, 1885.

Application filed September 4, 1884. (No model.)

*To all whom it may concern:*

Be it known that I, JOSIAH W. ELLS, a citizen of the United States, residing at Pittsburg, in the county of Allegheny and State of Pennsylvania, have invented certain new and useful Improvements in Manufacture of Hoes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the hoe for which Letters Patent of the United States were granted to me on the 30th day of March, 1880. That hoe is constructed of a single piece of sheet metal of uniform thickness throughout, and provided with an inverted U-shaped shank tapering from the blade outward to fit it for being driven into a handle, and also provided with side wings brought together underneath the shank and extended down to near the middle of the blade, where they are secured by means of a rivet. That construction of hoe requires a hole in the handle for the reception of the shank, and a special ferrule to prevent its splitting, neither of which are at all times and places easily provided. The use of wings and the extension thereof a distance below the shank make the use of a rivet necessary, thereby adding an extra cost to the hoe, besides interfering with the proper polishing of its blade, which being of an equal thickness throughout, a deal of labor is required to regularly reduce its thickness from the top down to its cutting-edge.

The improvement I have made is such as to entirely dispense with the wings, and consequently the use of a rivet for holding them down on the blade; and the hoe is provided with a hollow coniform socket for the reception of a handle, instead of a simple shank or tang to be driven thereinto. The blade and socket are also gradually thinned from their point of juncture to the extremity of each, thus leaving an extra thickness of metal at a very essential part without in any manner increasing the weight of the hoe.

My invention will be readily understood from the following description, taken in connection with the accompanying drawings, wherein—

Figure 1 represents a perspective view of my improved hoe; Fig. 2, a section of the same on a line through its socket and blade; Fig. 3, a single blank from which the hoe is made. Fig. 4 represents a plate or sheet of metal on which are delineated blanks of the shape required in the formation of my hoe; Fig. 5, a transverse section of such plate or sheet of metal; Fig. 6, a modified blank or one slightly changed in form, and Fig. 7 a perspective view of a hoe made from the modified blank less a portion of its blade.

To construct my improved hoe I take a sheet of steel of a width corresponding to the full length of a freshly-cut blank, which sheet of steel is thicker along the middle in the direction of its length than at any other part, being beveled or gradually thinned from its center toward and to each lateral edge. Transversely from such sheet of metal the blanks are cut after the manner indicated in the diagrams Fig. 4, that part where the dotted lines cross each other being taken from the middle or thickest portion of the sheet, while the cutting-edge of the blade and the opposite extremity are from the thinnest portion. The blank thus produced consists of a broad blade, A, provided with a narrower part, B, for the overlap, and a fan-tailed extension, C, for the socket. The blank is then made red hot and in that condition subjected to the joint action of such dies as will turn over and fold tightly down upon the upper face of the blade, that part B intended to form the root of the socket and at the same time bend the fan-tailed extension C into the shape of a hollow cone or tapering socket, D, and causing it to take a proper position at nearly right angles to the plane of the blade A, which bending is accomplished without undue strain or weakening of the metal.

In this hoe the hollow coniform socket D is supported on each side and top by an overlapping portion, B, of the blade, equaling one-half its entire width, which is folded on that angle with reference to the blade and socket as shall give the greatest strength thereto, The overfold B does not extend below the neck of the socket, thus leaving a clear surface from the cutting edge of the blade to that point, while the thickness of metal at the fold, together with the angularity of bend, is found amply sufficient to support any reasonable strain the implement may have to undergo.

By the use of sheet-steel shaped as shown and described for the formation of blanks an extra thickness of metal at and along the angular fold and a gradual thinning of the blade and socket from that point outwardly is easily obtained, and which very materially increases the strength, efficiency, and appearance of the hoe without adding anything to its weight.

When a small semicircular notch, $a$, is cut in each side of the blank where the fan-tailed part C joins that portion, B, reserved for the overlap, the neck of the socket will take the form of an inverted letter U; but by dispensing with these notches the socket will be closed its entire length and all the way down to the blade, as shown in the drawings, Fig. 7.

Having thus described my invention, what I desire to secure by Letters Patent is—

1. As a new article of manufacture, a hoe formed of a single piece of sheet metal without seam, rivet, or joint, and having a coniform socket and an angular overlap of the blade formed on each side of said socket, substantially as described.

2. As a new article of manufacture, a hoe formed of a single piece of sheet metal without seam, rivet, or joint, the blade of which is gradually thinned from its top down to its cutting-edge and provided with a coniform socket and having an angular overlap of the blade on each side of the socket, substantially as described.

3. As a new article of manufacture, a hoe formed of a single piece of sheet metal without seam, rivet, or joint, the blade of which is gradually thinned from its top down to its cutting-edge, and provided with a coniform socket, also thinned from its point of juncture with the blade to its outward extremity, and with an overlap of the blade on each side of the socket, substantially as described.

4. A plate or sheet-metal blank for the construction of hoes, consisting of a broad portion for the blade A, having integral therewith a fan-tailed extension, C, for the socket, each of which is gradually thinned from or near its point of juncture—that is, to the cutting-edge of the blade in one direction and the extremity of the fan-tailed extension in the opposite direction.

5. A plate or sheet-metal blank for the construction of hoes, consisting of a broad portion for the blade A, having integral therewith a narrower part, B, for the overlap, and a fan-tailed extension, C, for the socket, and thinned from or near the middle of the blank to the cutting-edge of the blade in one direction and the extremity of the fan-tailed extension in the opposite direction.

6. A hoe-blank having a gradually thinned or tapering blade and a gradually thinned and tapering part for the socket, the same being formed by cutting such blank from a previously-beveled or gradually-thinned plate or sheet of metal.

In testimony whereof I affix my signature in presence of two witnesses.

JOSIAH W. ELLS.

Witnesses:
   JNO. W. MACDONALD,
   JAS. G. BELL.